(12) United States Patent
Marggraff et al.

(10) Patent No.: US 9,250,718 B2
(45) Date of Patent: Feb. 2, 2016

(54) SELF-ADDRESSING PAPER

(75) Inventors: James L. Marggraff, Oakland, CA (US); Alexander Sasha Pesic, San Ramon, CA (US); Tracy L. Edgecomb, Berkeley, CA (US)

(73) Assignee: Livescribe, Inc., Oakland, CA (US)

( * ) Notice: Subject to any disclaimer, the term of this patent is extended or adjusted under 35 U.S.C. 154(b) by 845 days.

(21) Appl. No.: 12/129,281

(22) Filed: May 29, 2008

(65) Prior Publication Data

US 2009/0000832 A1 Jan. 1, 2009

Related U.S. Application Data

(60) Provisional application No. 60/940,671, filed on May 29, 2007.

(51) Int. Cl.
| G06F 3/033 | (2013.01) |
| G06F 3/0354 | (2013.01) |
| G06F 3/038 | (2013.01) |
| G06Q 10/10 | (2012.01) |

(52) U.S. Cl.
CPC .......... *G06F 3/03545* (2013.01); *G06F 3/0383* (2013.01); *G06Q 10/107* (2013.01)

(58) Field of Classification Search
CPC .............. G06K 7/10544; G06K 9/222; G06F 3/03545; G06F 3/04883
USPC .............. 178/19; 358/402, 468, 442; 345/179
See application file for complete search history.

(56) References Cited

U.S. PATENT DOCUMENTS

| 7,175,095 | B2 | 2/2007 | Pettersson et al. |
| 7,281,664 | B1 | 10/2007 | Thaeler et al. |
| 7,388,685 | B2* | 6/2008 | Kia et al. ..................... 358/1.15 |
| 7,397,468 | B2* | 7/2008 | Braun ................. G06F 3/03545 345/173 |
| 7,453,447 | B2* | 11/2008 | Marggraff ............. G06F 3/0317 178/19.01 |
| 7,580,164 | B2* | 8/2009 | Barrus et al. ................... 358/474 |
| 7,944,573 | B2* | 5/2011 | Henry et al. ................. 358/1.15 |
| 2002/0091711 | A1* | 7/2002 | Ericson ................... G06F 3/002 |
| 2003/0046256 | A1* | 3/2003 | Hugosson et al. ................. 707/1 |
| 2003/0122839 | A1* | 7/2003 | Matraszek ........ G06F 17/30265 345/581 |
| 2004/0229195 | A1 | 11/2004 | Marggraff et al. |
| 2005/0110778 | A1* | 5/2005 | Ben Ayed ..................... 345/179 |
| 2005/0138541 | A1* | 6/2005 | Euchner ................ G06F 17/241 715/205 |
| 2006/0033725 | A1 | 2/2006 | Marggraff et al. |

(Continued)

FOREIGN PATENT DOCUMENTS

WO WO 2007/141204 A1 12/2007

OTHER PUBLICATIONS

PCT International Search Report and Written Opinion, PCT/US2008/065117, Sep. 11, 2008, 9 pages.

*Primary Examiner* — Grant Sitta
*Assistant Examiner* — Amen Bogale
(74) *Attorney, Agent, or Firm* — Fenwick & West LLP

(57) ABSTRACT

A "self-addressing" writing surface, such as paper, includes an encoded identifier that is uniquely associated with the recipient or a group of recipients. A pen-based computing system is used to capture writing made on the writing surface. The captured writing and the recipient identifier are sent electronically to a routing system, which identifies the recipient to which the content is to be routed based on the recipient identifier. The routing system forwards the message to the identified recipient, thereby enabling communication from the writer to the recipient associated with the writing surface.

19 Claims, 3 Drawing Sheets

(56) References Cited

U.S. PATENT DOCUMENTS

| | | |
|---|---|---|
| 2006/0066591 A1 | 3/2006 | Marggraff et al. |
| 2006/0067576 A1 | 3/2006 | Marggraff et al. |
| 2006/0067577 A1 | 3/2006 | Marggraff et al. |
| 2006/0077184 A1 | 4/2006 | Marggraff et al. |
| 2006/0078866 A1 | 4/2006 | Marggraff et al. |
| 2006/0080608 A1 | 4/2006 | Marggraff et al. |
| 2006/0080609 A1 | 4/2006 | Marggraff et al. |
| 2006/0125805 A1 | 6/2006 | Marggraff et al. |
| 2006/0127872 A1 | 6/2006 | Marggraff et al. |
| 2006/0292543 A1 | 12/2006 | Marggraff et al. |
| 2007/0011140 A1 | 1/2007 | King et al. |
| 2007/0097100 A1 | 5/2007 | Marggraff et al. |
| 2007/0143663 A1* | 6/2007 | Hansen et al. ............... 715/512 |
| 2007/0280627 A1 | 12/2007 | Marggraff et al. |

* cited by examiner

SELF-ADDRESSING PAPER

CROSS REFERENCE TO RELATED APPLICATIONS

This application claims the benefit of U.S. Provisional Application No. 60/940,671, filed May 29, 2007, which is incorporated by reference in its entirety.

BACKGROUND

This invention relates generally to pen-based computing systems, and more particularly to communicating with a pen-based computing system using paper that is linked to a recipient destination for the communication.

Communication between individuals and groups is a core component of those relationships. Friends and relatives want to send messages to one another. Business associates need to keep in touch and send updates to one another. Companies want and need to hear from their customers. Groups of people often wish to broadcast communications across the entire group membership. The current methods of communication that address these needs are generally electronic, require the sender to have some type of contact information for the recipient, and allow unlimited access to the recipients.

Electronic communication methods require the message sender to be familiar and comfortable with the technology associated with the contact info provided, e.g., email or text messaging. In contrast, the convenience of writing on paper is usually paired with a cumbersome process of moving the data between users, as the paper must be faxed, mailed, or otherwise communicated to reach a recipient. And both of these methods typically require the sender to have some knowledge of the recipient's contact information in order to send the message.

When a person gives out a method of contacting them (email address, IM name, phone number, address, etc.) it usually grants the recipient a method of unlimited contact. There is no way to place a limit on the amount of contact allowed, or the number of times the contact method can be used. Most methods of contact, when distributed, reveal information about the owner. Phone and fax numbers reveal a geographic location; email addresses often include information about a workplace or other affiliation; and postal addresses give away complete real-world location information. Often a consumer will wish to grant to someone the right to communicate with them while maintaining anonymity or privacy.

In addition, existing communication methods are often not available when people actually wish to communicate. When a person may have an idea for communication occur to them— e.g., when they are out and about, in the middle of a class or meeting, or otherwise engaged in an activity—most methods of written communication are not available or convenient. And yet, the most useful time for some types of communication, such as customer feedback or suggestions regarding a product, are precisely when the user is in the midst of using and interacting with a product or where traditional electronic communication means are not feasible.

Accordingly, a new mode of communication is needed to fill the needs unmet by existing communication methods.

SUMMARY

Embodiments of the invention present a new way to communicate by simply writing on "self-addressing" paper so that the person sending the message need not specify (or even know) the address of the recipient who is to receive the message. In one embodiment, a piece of paper or other writing surface is associated with a recipient (or a group of recipients), for example, by including an encoded recipient identifier on the paper that is uniquely associated with the recipient. The recipient identifier may simply be a set of coordinates or other metadata encoded on the paper, where the metadata can be associated with an actual address or other delivery information for sending the message to the recipient. When someone writes on the paper using a smart pen, the writing is captured electronically by the smart pen along with the recipient identifier. The captured written content (and possibly other types of content, such as recorded audio, application, or data attachments) and the recipient identifier are then sent electronically to a routing system, which identifies the recipient to which the message is to be routed based on the recipient identifier. The routing system forwards the message to the identified recipient, thereby enabling communication from the writer to the recipient associated with the writing surface.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
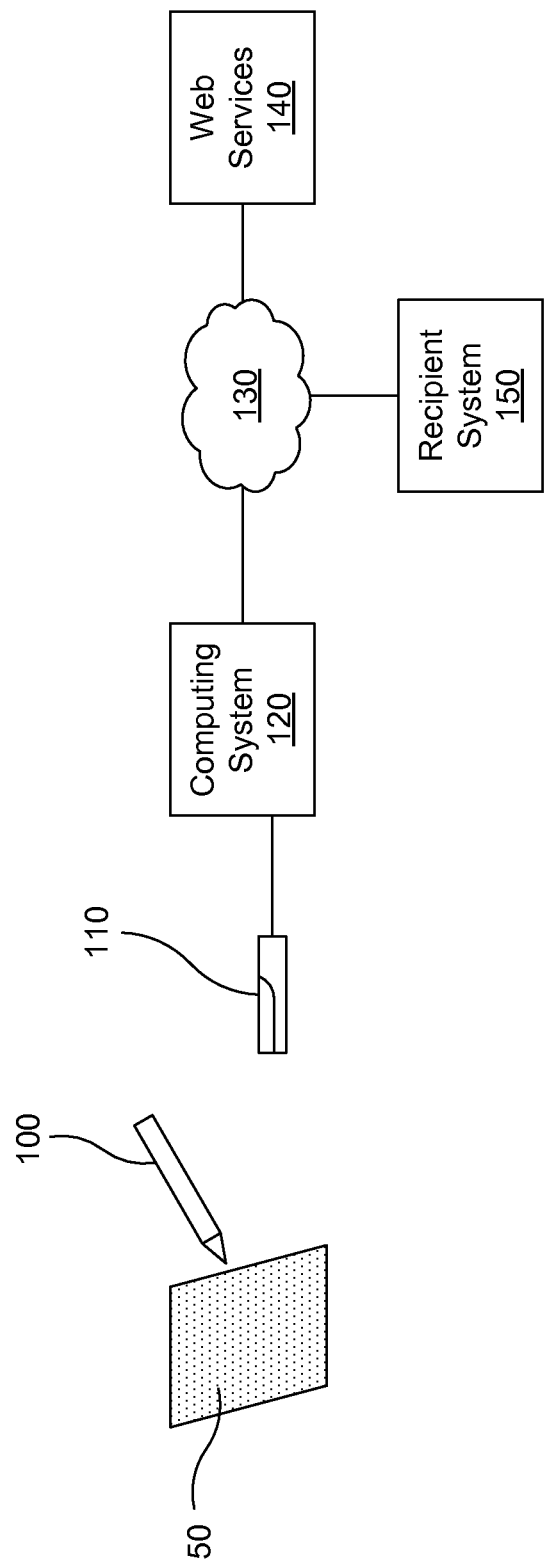
FIG. 1 is a schematic diagram of a pen-based computing system, in accordance with an embodiment of the invention.

Embodiments of the invention may be implemented on various embodiments of a pen-based computing system, and other computing and/or recording systems. An embodiment of a pen-based computing system is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information or playing audio. In other embodiments, the smart pen 100 includes additional input modalities, such as motion sensing or gesture capture, and/or additional output modalities, such as vibrational feedback.

Figure 2:
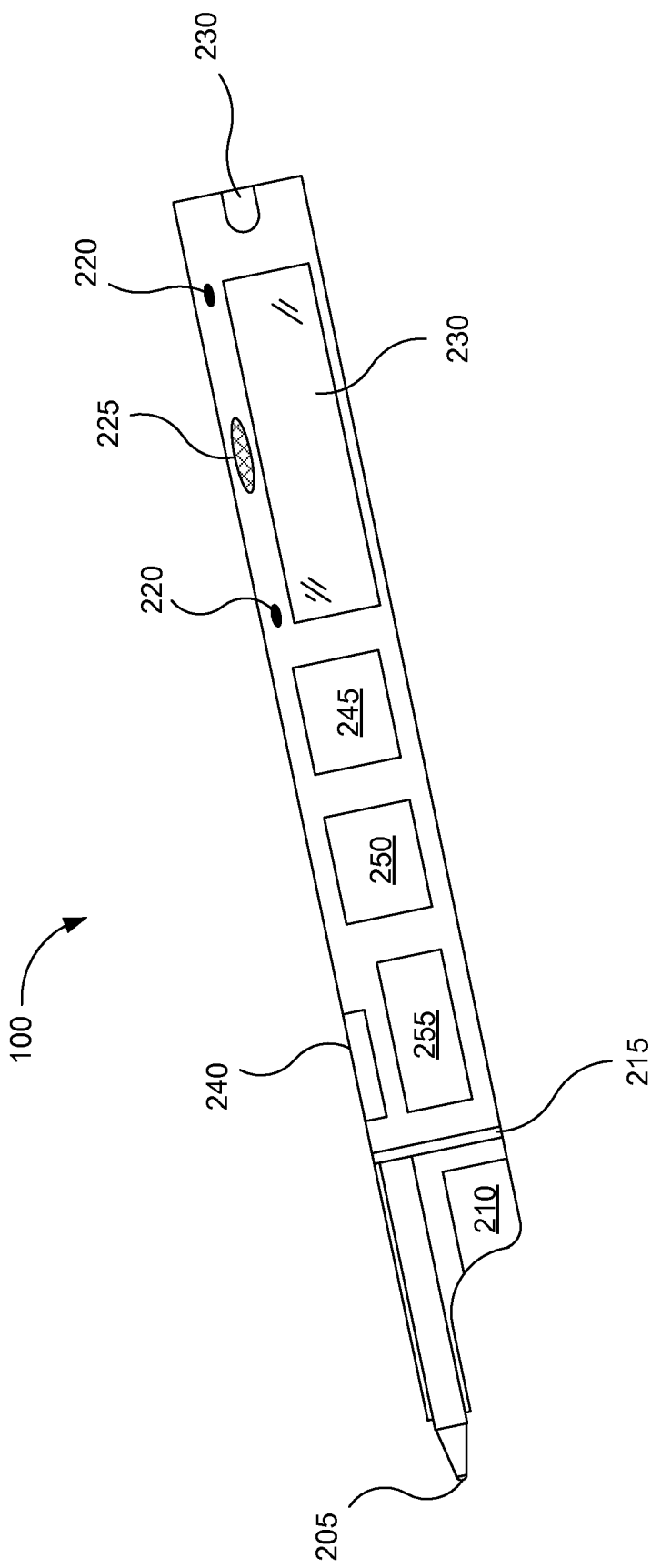
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50 or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sensor movement of the pen's tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use any other appropriate means for achieve the same function.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100. Various other combinations of input modalities and output modalities are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword, or a physical motion, may indicate that subsequent input is associated with one or more application commands. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. This input may have spatial (e.g., dots side by side) and/or temporal components (e.g., one dot after the other). Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Overview of Self-Addressing Paper

Embodiments of the invention present a new way to communicate by simply writing on "self-addressing" paper so that the person sending the message need not specify (or even know) the address of the recipient who is to receive the message. In one embodiment, a piece of paper or other writing surface is associated with a recipient (or a group of recipients), for example, by including an encoded identifier on the paper that is uniquely associated with the recipient. The recipient identifier may simply be a set of coordinates or other metadata encoded on the paper, where that metadata can be associated with an actual address or other delivery information for sending the message to the recipient. When someone writes on the paper using a smart pen, the writing is captured electronically by the smart pen along with the recipient identifier. The captured written content (and possibly other types of content, such as recorded audio, application, or data attachments) and the recipient identifier are then sent electronically to a routing system, which identifies the recipient to which the message is to be routed based on the recipient identifier. The routing system forwards the message to the identified recipient, thereby enabling communication from the writer to the recipient associated with the writing surface.

Because the paper is pre-associated with a particular recipient, the paper can be thought of as "self-addressing paper." With self-addressing paper, consumers can purchase or lease an area of paper that is uniquely tied to them. In one embodiment, an area of paper can be associated with a consumer by printing a coding pattern on the paper, such as with the dot-enabled paper discussed above. In this way, the consumer is really associated with the assigned pattern (i.e., a subset of the possible or available patterns) rather than the physical sheet of paper, which leads to many useful applications. For example, the same pattern can be printed on a several sheets of paper, or a pad of paper, so that each sheet of paper provides the same self-addressing functionality.

By distributing the self-addressing paper, the consumer associated with the paper can provide others with the ability to communicate with the consumer by simply writing on the paper using a smart pen. The written communication is then automatically sent to the consumer associated with the paper, without requiring the writer to know anything about the recipient or the information required to route the communication to the recipient. This new mode of communication combines the ease and versatility of traditional paper-based writing with the power of modern computer and communication technologies. It also enables a wide array of possible uses, several of which are discussed below.

In addition, the owner of the self-addressing paper may also distribute an electronic version of the paper, rather than actual physical pages. The electronic version of the self-addressing paper may include the encoded pattern that associates that paper to the owner. Then others could print out the paper themselves and then write on it using their smart pens. This increases the flexibility of the distribution, since no physical handoff is required.

The following discussion of various embodiments of the invention is presented with reference to the figures. FIG. 1 is a block diagram of an example architecture for capturing and sending content using self-addressing paper. FIG. 1 illustrates a piece of self-addressing paper 50 and a smart pen 100 that can be used in conjunction with the paper 50. The operations described below may be performed by an application running on the pen 100, by an application running on an attached computing system 120, or a combination of the two. Alternatively, the pen 100 may be an input pen (an I/O device), which is capable of capturing the writing and reading the embedded recipient ID from the paper, and connected to a personal computer, mobile computing device, or server. The sender's system, a routing system, and the recipient system are coupled to a network, which may comprise the Internet or other WAN, a LAN, and/or any other type of network that is appropriate for the application. These systems are not necessary for every implementation.

Figure 3:
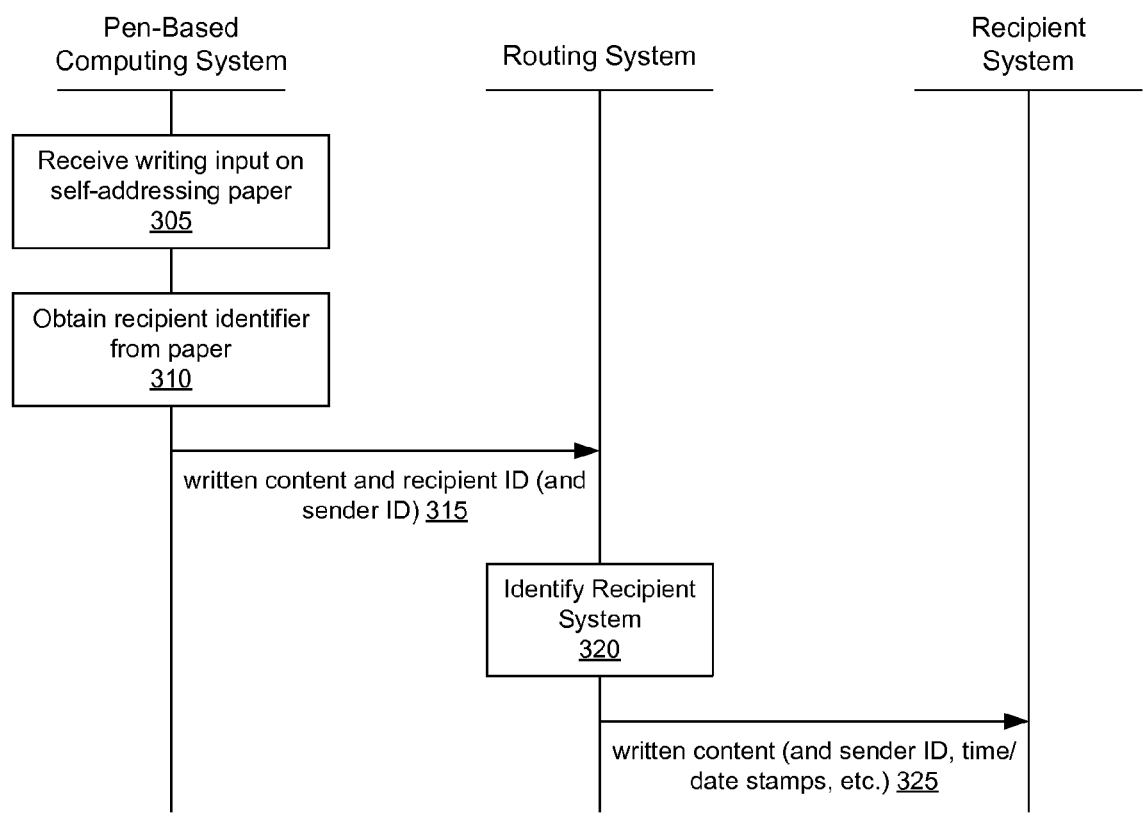
FIG. 3 is an interaction diagram illustrating a method of communicating using the self-addressing papers, in accordance with an embodiment of the invention.

FIG. 3 illustrates an embodiment of a process for using the self-addressing paper to communicate in the system of FIG. 1. In this process, the smart pen 100 of the pen-based computing system receives 305 writing input on the self-addressing paper 50 and obtains 310 the recipient identifier from the paper 50. The smart pen 100 may capture additional content and/or the computing system 120 may associate additional content with the message (such as an audio recording). The recipient identifier may simply comprise coordinates in an encoded pattern on the self-addressing paper that is readable by the smart pen, where the coordinates have been or will be associated with one or more recipients. In such a case, the a routing system may store a table that associates coordinates with actual recipients to enable delivery of the message, since the coordinates by themselves may not be sufficient to identify an intended recipient.

The pen-based computing system then uploads 315 the captured written content and the recipient identifier to a routing system (which may be part of the computing system 120 or one of the web services systems 140 illustrated in FIG. 1), which uses the recipient identifier to identify 320 the recipient system to receive the message. The routing system then delivers 325 the message containing the written content (and possibly other metadata about the message, such as a time stamp and the sender name) to the identified recipient system. The basic steps of this process, as well as various alternatives and other features, are described in more detail below.

Associating the Self-Addressing Paper with a Recipient

The self-addressing paper may be associated with a consumer in various ways, depending on the type of paper and the smart pen with which the paper is intended to be used. For example, the self-addressing paper may comprise the dot-enabled paper described above. This type of paper includes a dot pattern, which a smart pen can read and interpret to obtain a set of coordinates. As described, the coordinate space enabled by this dot pattern can be very large, so different sheets of paper can have different patterns that translate into different areas in the coordinate space. In this way, the coordinates of a particular location on a particular piece of paper can be used to identify the paper uniquely.

A person then may be associated with a particular piece of self-addressing paper by being associated with the area within the coordinate-space that is defined by the paper. For example, a person may purchase a pad of note paper that has a particular dot pattern printed on it. During the purchase, the person would register their identity or routing preference (e.g., the person's email address) to be associated with this paper. The seller of the paper—i.e., an administrator of the self-addressing paper service—would then associate the customer with the purchased self-addressing paper according to the coordinate space included in the purchased paper.

Continuing the example of the purchased pad of self-addressing paper, each piece of paper in the pad may have a different dot pattern or may have the same dot pattern. Having a different pattern for each sheet of paper may allow the customer to track the use of each sheet of paper separately, which may be beneficial in some applications. But this also consumes more of the uniquely definable area, so it may be more expensive. If the consumer is unconcerned with tracking individual uses of the paper, each sheet of paper in a purchased pad may have the same pattern.

In addition to a particular individual, the self-addressing paper may be associated with an entity (such as a business) or with a group of people or entities (e.g., to broadcast a message via the paper). Groups of people may order assortments or packages that include paper registered to a number of owners. For example, a graduating class can order a yearbook portfolio comprising a page for every student, or a club can print member rosters with a space next to each name for sending a message to any member.

The self-addressing paper may be purchased in a store, online, or in a variety of channels, and the purchasing process may allow for a variety of options by the consumer. For example, customers may request a region of custom paper through a web interface, customers may place an order for pre-printed paper or other media in a variety of sizes and formats, or customers may design and print their own paper. Many popular paper sizes may be supported, including, but not limited to: notebooks, journals, legal size, tabloid size, business cards, sticky notes, index cards, customer feedback forms, and product registration forms. Novelty sizes/shapes may also be provided, including: matchbooks, wedding announcements, party invitations, bookmarks, posters, and gift tags. Online or desktop tools may allow customers to add custom or template graphics and text (e.g., "From the desk of . . . ", "While you were out," company name, company logo, instructions, questions such as "Tell us what you think of our product"), snapshots, famous artwork, maps, sketches, or colorful patterns.

When purchasing the paper, the customers may specify how they want content from the self-addressing paper to be delivered to them. Possible options include, without limitation, one or a combination of the following: email to one or more addresses email to a group address; post to a private web-accessible page; post to a blog; post to a wiki; forward to an MMS-enabled phone; convert to text and forward as SMS; convert to speech and forward as a voice mail; send as a fax; send to a service that prints out content on high-quality paper and mails it; or long-term electronic storage of content (e.g., in conjunction with other methods of delivery). Once customers have ordered or printed their self-addressing paper, they can begin distributing it or using it themselves. As mentioned above, customer may also choose to distribute self-addressing paper electronically, for others to print out and then use.

In addition to the dot-enabled paper described above, various other technologies may be used with other embodiments of the invention. For example, a sheet of paper may include a bar code or other machine-readable pattern, which could then be associated with a recipient. If the paper were electronically enabled, such as in a smart pen computing system that uses digital ink, an electronic identifier may be obtained from the digital "paper."

In another embodiment, the portion of the coding pattern that is self-addressing (i.e., associated with a particular recipient) may just be a small region or a smaller area on a sheet of paper than the area that can accept writing input from the smart pen computing system. In such a case, the person using the paper could tap that space to address the message, and then write the actual message elsewhere (e.g., on any blank piece of dotted paper). The small region that was tapped would be associated with the recipient (e.g., its area would be linked to the routing information that provides the self-addressing functionality described herein), so that everything the sender writes until an action ending the note (e.g., until the user taps the space again, double-taps anywhere, switches applications, or some other event occurs to end the note) would be included in what is sent to the recipient. Beneficially, this implementation does not limit the size or amount of what can be sent, and it allows for easy reusability of the "self-addressing spot."

In addition, although discussed in term of sheets of paper, the term includes any surface that can accept writing, such as product packaging and labels, walls with posted information, or any other area on which someone may write with the intension of delivering that content to another. The term also includes any electronic surface that can accept writing using a stylus or similar implement.

Capturing Content from the Self-Addressing Paper

Any smart pen can be used to write on the self-addressing paper. For example, the person associated with the self-addressing paper may write on the paper. This could be useful, e.g., to allow someone to write content that is automatically routed to their own blog. Alternatively, another user can write on the self-addressing paper, e.g., to communicate with the "owner" of the self-addressing paper.

When any content is written or drawn on the self-addressing paper with a smart pen, that information is captured by the pen. In other embodiments, content in addition to written content can be captured. For example, audio or video can be added by the user so that both the audio and/or video and what is written is forwarded to the recipient associated with the self-addressing paper. The audio may be captured by a microphone within the smart pen or otherwise coupled to it. The video may be captured by a video camera within the smart pen or otherwise coupled to it. Moreover, written content may not be necessary at all, as the self-addressing paper may be used to capture audio or video content (or other non-written content) without any writing, and the self-addressing paper used only to associate this content with the recipient associated with the self-addressing paper.

The self-addressing paper may have the same functionality as regular dot-enabled paper in a smart pen computing system. Accordingly, other smart pen applications may be invoked on the self-addressing paper, such as a calculator application. In one embodiment, if a smart pen application is used on the paper, the application itself or related content may be attached to the communication. For example, a writer may wish to explain a mortgage calculation to a recipient, and on the paper the writer writes an explanation of the calculation and creates a calculator application on the paper. The content delivered to the recipient would then include the writing and the calculator application (which may resemble the drawn calculator or just be a standard calculator), allowing for a more effective communication. Smart pen applications may also be preprinted and defined on the self-addressing paper before distribution.

In other embodiments, other functions or content can be attached to the note by the writer. For example, the user of the paper could select a data file currently stored on their smart pen and mark it for inclusion. When the message is delivered to the owner of the self-addressing paper, the included data file would also be transmitted. In one embodiment, a sender can also forward an entire pen application in this way.

The content is captured during a session with the self-addressing paper. The writing session may be ended expressly by the writer, or the end of the session may be inferred by the system. For example, the writer may expressly end the session by tapping an area on the paper that is predefined to end the session. This area may indicate such a functionality, e.g., a box that says: "Tap here to send message." Alternatively, the system may continue to capture any writing on the paper and then automatically send the content whenever the pen is docked or otherwise can communicate the message, thereby inferring the end of the session.

Routing the Content to the Recipient System

Once the smart pen is docked to a personal computer or otherwise can communicate and synchronize with the routing system, the captured recipient identifier and the captured content are transferred to the routing system. As described, the recipient identifier may include coordinates in the "dot-space" of the self-addressing paper, a unique identifier (e.g., from a bar code), or some other information that can be used to identify the recipient. Coordinates need not be sent as a separate identifier, as the coordinates may be obtained in some embodiments from the captured written content itself.

The routing system includes a database of each unit of the self-addressing paper, the recipient associated with the paper, and the delivery instructions. The content is then automatically forwarded to the recipient of the self-addressing paper according to whatever delivery instructions the recipient has specified.

In one embodiment, metadata about the message may be included with the message. For example, the name or other identifying information of the user who wrote on the paper can be forwarded to the recipient. The sender information may be obtained, for example, from a unique identifier from the smart pen used to write the note. The pen used to write the note may also save the time and date that the note was written and send that information with the content. The routing system can then send a date and time stamp for the creation date as well as the time and date that the routing system received the note. In an embodiment, the metadata sent to the client includes information about the conditions under which the writing was made (e.g., pen speed, angle, pressure, and the like).

In another embodiment, the metadata sent to the client includes biometric data of the author, where the verification of the author of the message takes place in the pen, at the user's computing system, or at a routing server. In one use case, an owner of the self-addressing paper may give a sheet to a person and ask that person to sign it. At some future time, the person may write another note on the paper, signing the note again. These signatures may then be compared electronically to verify that the person writing the latter message is the same person to whom the paper was originally given.

In another embodiment, a set of rules based on how written content was added to the self-addressing paper is used to determine the recipient of the message. For example, if the self-addressing paper is a business reply card in a magazine, the paper may contain check boxes and a space to write a comment. Based on which boxes are checked, the message is sent to a different person or group of people. In another embodiment, the self-addressing paper includes a check box for each recipient, where the author can write a mark in each box corresponding with the names of an individual to whom the author wants the message sent. This allows the self-addressing paper to be associated with a set of recipients, where the set is adjustable by the author. The routing system might also route the message based on when the comment was written, keywords within the written comment (obtained, e.g., via OCR), or other portions of the content of the message, as desired.

Other Features

The above embodiments of the invention may support additional features, which may be implemented together or separately to provide enhanced functionality. Some of these additional features may include the following.

In one embodiment, a copy of the captured writing and other content is stored for access by the smart pen user who wrote on the paper.

In another embodiment, identifying information for the particular type of paper used is forwarded to the owner of the paper, and this information can be used to help the owner distinguish different uses of their self-addressing paper. For example, a person may use one coding pattern on business cards and another coding pattern on party invitations. Any written content on a business card or a party invitation might be forwarded to the same email address, but the messages may be tagged to indicate to the recipient on which coding pattern the writing was captured (and hence, whether the writing came from a business card or a party invitation).

In another embodiment, the geographic location of the writer on self-addressing paper is forwarded to the owner when the writing or other content was captured using a wireless or GPS enabled device or using a smart pen coupled thereto.

In another embodiment, special regions can be included on the self-addressing paper that contain feedback to the writer. For example, when tapped, a location on the paper could display a message on the smart pen or play a piece of audio. This may provide a convenient mechanism to give the writer feedback or instructions for how to write information on the paper. in this embodiment, the smart pen may include an application running thereon configured to recognize the special region and perform the desired function in response (e.g., playing recorded audio instructions).

In another embodiment, applications may be launched and run on self-addressing paper, just as on other dot-enabled paper. If desired, applications may be limited to only run on particular self-addressing paper. Moreover, applications may be excluded from running on particular self-addressing paper. The content or other information related to the running of an application that is launched on self-addressing paper may be transmitted to the owner of the self-addressing paper.

In another embodiment, a particular sheet of self-addressing paper is limited in its reuse, so that it can be used to send messages a certain number of times, after which the self-addressing paper no longer functions. The limitation on reuse may be for all users, or it may apply on a per-user basis. For example, a sheet of self-addressing paper may allow each user (as identified by a unique pen identifier) to write and send a message only once. The limitations on reuse may be implemented by the routing system.

In another embodiment, the routing system filters the content according to rules, which may be defined by the operator of the routing system and the owner of the self-addressing paper. For example, the operator may block any content that is obscene or offensive, or the owner of the self-addressing paper may block any attachments that are greater than a certain file size maximum.

In another embodiment, a piece of paper requires an authorization code to be activated. This could be, for example, a number or word that must be written on the page.

In another embodiment, virtual self-addressing paper can be created and used, where any dot-enabled paper can be used in a way that mirrors the self-addressing paper functionality.

Example Uses of Self-Addressing Paper

The self-addressing paper enables a wide array of use scenarios, a sample of examples of which are described below:

- A company distributes a page of self-addressing paper with its product, encouraging users to send them feedback or product suggestions.
- A company distributes business cards to its employees, where the reverse side of the business cards include a dot pattern associated with the employee identified in the card. The reverse side of the card instructs one to write a note, and when someone does write a note using a smart pen, that note is routed to the owner of the card, e.g., via email.
- A customer purchases self-addressing paper in greeting-card format and gives a package to his parents, who are technophobic and do not like using email. The self-addressing paper owner explains: "Just write on these cards any time you want to send me a note!"
- A customer sends out party invitations on self-addressing paper with the RSVP instructions: "Just write your answer on the invitation."
- At a class reunion, booklets are distributed with a page for each attendee printed on self-addressing paper. When anyone wants to keep in touch afterwards, they can write a note on the page of the person they want to communicate with. Additionally, several pages at the back of the booklet can be used to send a message to everyone in the group at once.
- An author includes a page of self-addressing paper at the end of their books, encouraging readers to write in comments or questions. Questions and answers from the author are then posted on a public website, allowing for a constant "meet the author" session to occur.
- A customer keeps a small notepad of self-addressing paper handy for use in making posts and updates to a personal blog.
- Movie tickets are printed with self-addressing paper on the back, and movie-goers are encouraged to write "instant reviews" of the movie, along with a rating, all of which are posted on the movie's website.
- Concert tickets are printed with self-addressing paper on the back and attendees are encouraged to join the musician's mailing list by writing their email address on their ticket.
- Multiple people write on a single sheet of self-addressing paper, and each author's pen keeps track of what that person wrote. The written content from each of the collaborators is then collected into a single note. The note may also keep track of each individual's contribution to the note (e.g., using color coding to indicate who wrote what).
- The recipient for a message may be decoupled from an address from an actual person. In this way, if the message is intended for someone's position, rather than the person, the message will be routed properly if, for example, the person changes position or leaves a company.
- A recipient associated with a sheet of self-addressing paper may update their delivery options. For example, a user could change the email address to where they want the messages sent, or they could switch between delivery methods such as email, fax, cell phone, or automatic posting to a blog.

It will be appreciated that these are merely examples of the many applications enabled by self-addressing paper, as the possible uses are limitless.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for delivering an electronic communication, the method comprising:
   receiving from a digital pen device, a digital message and a recipient identifier, the digital message comprising digitally captured writing gestures made on a writing surface using a digital pen device and metadata including at least a timestamp representing a capture time of the writing gestures, wherein the writing surface is encoded with the recipient identifier and is captured by the digital pen device together with the captured writing gestures;
   identifying, by the server, a plurality of destination addresses associated with the recipient identifier;
   automatically recognizing text in the digitally captured writing gestures of the digital message;
   determining a selected destination address from the plurality of destination addresses associated with the recipient identifier based on one or more keywords in the recognized text matching a keyword associated with the selected destination address; and
   forwarding the digital message from the server to the selected destination address.

2. The method of claim 1, wherein the writing surface comprises an encoded coordinate system that is readable by the digital pen.

3. The method of claim 2, wherein receiving the recipient identifier comprises:
   receiving a set of coordinate values in the encoded coordinate system on the writing surface where the writing gestures were made; and
   identifying the recipient identifier as being associated with a region containing the coordinate values.

4. The method of claim 1, receiving the recipient identifier comprises:
   receiving a user selection on an addressing region of the writing surface using the digital pen device, wherein the addressing region includes an encoded pattern; and
   identifying the recipient identifier as being associated with the encoded pattern on the addressing region.

5. The method of claim 1, wherein forwarding the digital message comprises sending an electronic mail to the selected recipient address.

6. The method of claim 1, wherein forwarding the digital message comprising forwarding the digital message to a web server referenced by the selected recipient address for automatic inclusion within a web page.

7. The method of claim 1, further comprising:
   receiving audio recorded using the digital pen device; and
   including the recorded audio in the digital message.

8. The method of claim 1, wherein determining the selected recipient address for forwarding the digital message comprises determining the selected recipient address based at least in part on a specific time that the writing gestures were captured.

9. The method of claim 1, wherein the digital pen device captures the recipient identifier by tapping the digital pen device on a first portion of the writing surface, wherein the encoded identifier is located only on the first portion, and wherein the generated digital message comprises writing gestures captured on a second portion of the writing surface distinct from the first portion.

10. The method of claim 1, further comprising retrieving a data file from the digital pen device, and sending the data file with the digital message and captured recipient identifier to the selected recipient address.

11. The method of claim 1, wherein determining the selected recipient address for forwarding the digital message comprises determining if an authorization code is present on the writing surface.

12. The method of claim 1, further comprising verifying a sender of the digital message by comparing a signature from the captured writing gestures with a previously written signature.

13. A system for delivering an electronic communication, the system comprising:
   a writing surface that is encoded with a recipient identifier;
   a digital pen device comprising:
      a storage medium,
      a writing capture system for digitally capturing writing gestures made on the writing surface using the digital pen device, the captured writing gestures for inclusion in a digital message,
      a processor for incorporating metadata into the digital message, the metadata including at least a time stamp representing a capture time of the writing gestures, and
      an identifier module for capturing the recipient identifier associated with the writing surface; and
   a routing system capable of communicating with the digital pen device for receiving the writing gestures and identifier therefrom, the routing system to identify a plurality of destination addresses associated with the recipient identifier, automatically recognize text in the digitally captured writing gestures of the digital message, determine a selected destination address from the plurality of destination addresses associated with the recipient identifier based on one or more keywords in the recognized text matching a keyword associated with the selected destination address, and forward the digital message from the server to the selected destination address.

14. The system of claim 13, wherein the writing surface comprises an encoded coordinate system that is readable by the digital pen.

15. The system of claim 14, wherein the identifier module is configured to capture the recipient identifier by:
   determining a set of coordinate values in the encoded coordinate system on the writing surface where the writing gestures were made; and
   identifying the recipient identifier as being associated with a region containing the coordinate values.

16. The system of claim 13, wherein the identifier module is configured to capture the recipient identifier by:
   receiving a user selection on an addressing region of the writing surface using the digital pen device, wherein the addressing region includes an encoded pattern; and identifying the recipient identifier that as being with the encoded pattern on the addressing region.

17. The system of claim 13, wherein the routing system is to forward the digital message as an electronic mail to the selected recipient address.

18. The system of claim 13, wherein the routing system is to forward the digital message to a web server referenced by the selected recipient address for automatic inclusion within a web page.

19. The system of claim 13, wherein the digital pen device further comprises:
   an audio recording module for recording audio and adding the recorded audio to the digital message.

* * * * *